UNITED STATES PATENT OFFICE.

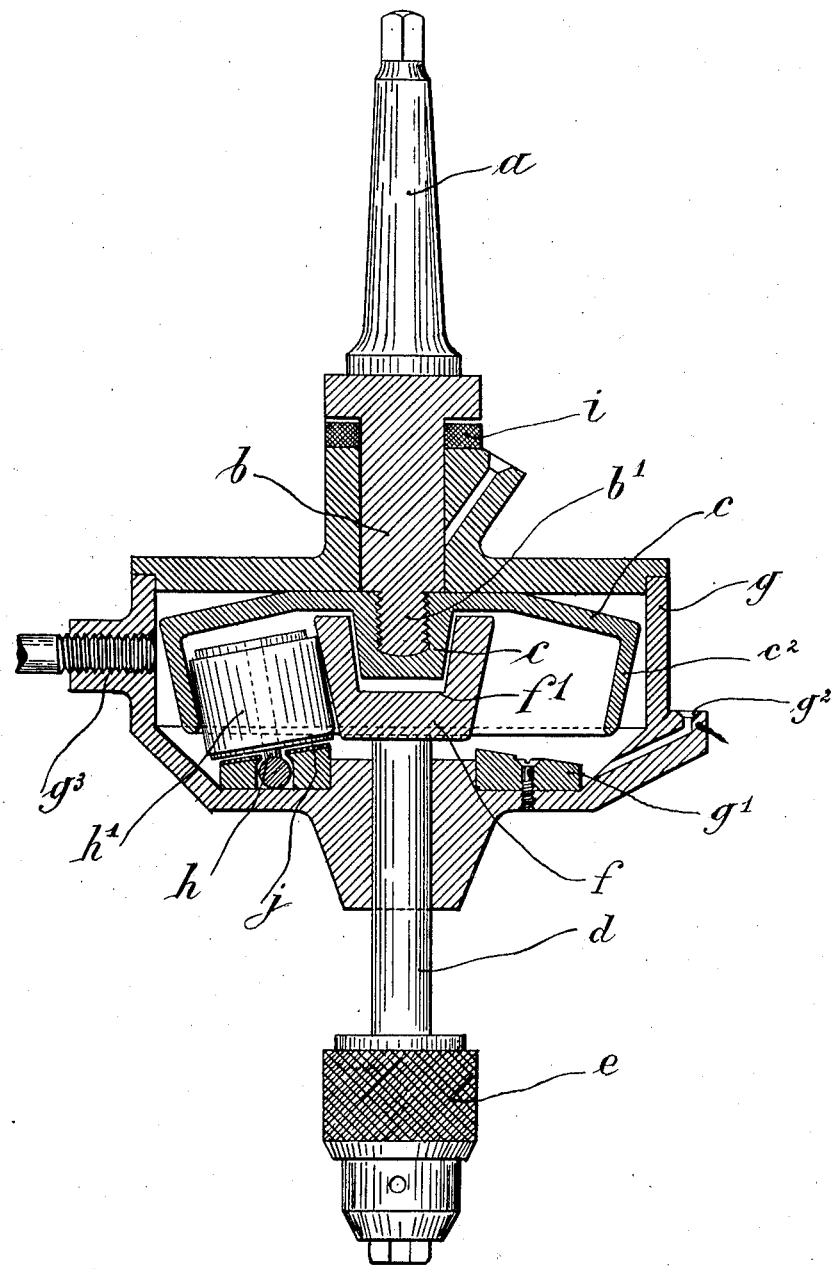

FERNAND VICTOR PERCIN, OF VILLEJUIF, FRANCE.

REVERSING MECHANISM.

1,359,422.                     Specification of Letters Patent.     Patented Nov. 16, 1920.

Application filed September 16, 1918. Serial No. 254,225.

*To all whom it may concern:*

Be it known that I, FERNAND VICTOR PERCIN, engineer, citizen of the French Republic, residing at Villejuif, Department of Seine, France, have invented certain new and useful Improvements in Reversing Mechanisms, of which the following is a specification.

This invention relates to reversing mechanism and refers more particularly to mechanism of the class in question interposed, in certain machine tools, such as screw-cutting machines, between the driving spindle and the tool holder, the rotating of which is controlled from the said spindle.

The principal object of the invention is to enable apparatus of the class in question to be so constructed that it operates without shocks.

The invention consists essentially in providing, in the construction of apparatus of the class in question, designed to be interposed between an operating spindle and a spindle or device to be controlled, located in the same axial line—in addition to any suitable clutch adapted to couple or uncouple, as required, the two spindles, one of which is controlled by the other—a system of pulleys or their equivalents so mounted between two co-axial cones, that the said pulleys are clamped between the cones when, and only when, the said clutch is brought into the uncoupled position and the movement communicated to the clutch for bringing it into that position is accentuated or further continued.

The invention includes, in addition to the foregoing charactertistic feature other details which will be more fully described hereafter.

It comprises certain constructional arrangements, apparatus embodying the features of the invention as new industrial products and special parts for the construction of the apparatus according to the invention and machines provided with the apparatus.

In order that the invention may be clearly understood it will now be described with reference to the accompanying drawing which, however, is merely given by way of example.

The drawing shows a longitudinal section of a reversing mechanism constructed according to the invention and fitted to a screw cutting machine.

According to the method of carrying the invention into effect illustrated in the drawing in which the mechanism for reversing is shown interposed between the driving spindle and the tool holder:

$a$ is a cone adapted to engage or take its seating in the driving spindle of the screw cutting machine. This spindle may be adjustable in the ordinary manner in the direction of its axis.

The said cone is provided at the base with an axial extension $b$, the extremity of which $b^1$ is screw threaded.

A clutch $c$ is provided furnished with a male cone $c^1$, and a flange $c^2$ projecting on the same side as the cone $c^1$, and so formed as to constitute a female cone the section of which diminishes from the base toward the opening. A screw threaded hole is also provided at the back of the element $c$, for enabling it to be attached to the screw threaded extension $b^1$ of the spindle $b$, with the cones projecting from the side opposite to the said spindle.

$d$ is an ordinary tool holder or tap holder having attached thereto at the extremity opposite to that to which the chuck $e$ is attached, a clutching element $f$ constituted by a truncated cone tapering outward toward its extremity and having the angle at the top approximately equal to the angle at the top of the female cone $c^2$; and recessed at $f^1$ to form a female cone within which the male cone $c^1$ can engage.

$g$ is the casing, in the upper plate of which a hole is provided for the passage of the spindle $b$ and in the lower plate of which a hole is also provided through which the tool carrier passes in such a way that its axis is in the prolongation of the axis of the cone $a$. The casing $g$ is of sufficient size to inclose the clutching elements $c$ and $f$ and to enable them to be brought nearer together or separated from one another.

Mounted either at the bottom of the casing, or preferably in recesses provided within a ring $g^1$ fixed to the bottom of the casing, are a certain number of axles $h$, for instance three, and these are mounted so that they can oscillate in a plane passing through the axis of the tool holder. Pulleys $h^1$ are rotatably mounted on said axles, the diameter of the pulleys being such that when the elements $c$ and $f$ are drawn apart they are gripped between the inner wall of the female cone $c^2$ and the outer wall of the male cone $f$.

The said casing $g$ is provided with an opening $g^2$ for lubricant and with a retaining pin which is screwed into a screw threaded hole $g^3$ and which prevents the case turning.

In addition a fiber washer $i$ is preferably provided interposed between the casing and the spindle $b$, and the fiber washer $j$ between the pulleys and their support.

In this way a reversing gear is obtained which operates in the following manner:

When the driving spindle is displaced toward the tool holder $d$ to cut a thread, the male cone $c^1$ engages with the female cone $f^1$ and the tool holder is rotated in the same direction as the spindle, without shocks which might break the thread being produced. When the cutting of the thread is finished, the spindle is moved in the opposite direction. The cone $c^1$ is thus disengaged from the cone $f^1$, but the female cone $c^2$ acting upon the pulleys $h^1$ causes them to oscillate and to come into contact with the male cone $f$.

When the cutting is sufficient, the cone $c^2$ transmits its rotary movement through the pulleys $h^1$ to the cone $f$, causing the tool holder to turn in the opposite direction to the driving spindle. The rotation of the said tool holder is very rapid, the rapidity being increased as the ratio of the two cones $c^2$ and $f$ is increased. The consequence is that the tool is very rapidly withdrawn from the hole which has been bored.

It will be understood that the invention is not limited in any way to the particular method of carrying it into effect which has been described with reference to the drawing.

The construction may be modified in various ways. For instance the clutching element $c$ may be integral with the shaft $d$ to be controlled, and the element $f$ with the driving parts $a$, $b$.

Having now particularly described and ascertained the nature of my said invention and in what manner the same is to be performed I declare that what I claim is:

1. In a reversing mechanism of the character described, the combination with two axially alined, relatively longitudinally movable shafts, of means for operatively connecting said shafts comprising cones carried by said shafts, respectively, said cones having opposed clutch portions engageable in one position of said shafts, and rotary transmission elements adapted to be clamped between said cones when said shafts are relatively moved to disengage said clutch portions.

2. In a reversing mechanism of the character described, the combination with a driving shaft and a driven shaft, of a clutch for directly connecting said shafts and comprising a male cone and a coöperating female cone, a second female cone rigidly connected with said male cone, a second male cone rigidly connected with said first-named female cone, and rotary transmission members adapted to be clamped between said second female cone and said second male cone when said first-named cones are separated to release said clutch.

3. In a reversing mechanism of the character described, the combination with two axially alined, relatively longitudinal movable shafts, of a clutch for directly connecting said shafts and comprising a male cone and a coöperating female cone carried by said shafts, respectively, a second female cone rigidly connected with said male cone, a second male cone rigidly connected with said first-named female cone, and rotary transmission members adapted to be clamped between said second female cone and said second male cone when said first-named cones are separated to release said clutch.

4. In a reversing mechanism of the character described, the combination with two axially alined, relatively longitudinally movable shafts, of a plate carried by one of said shafts at the end thereof adjacent the other shaft, said plate having a central conical projection disposed toward said other shaft and a concentric annular flange on the same side of the plate as said projection, said flange having an interior conical surface of outwardly decreasing diameter, a member carried by said other shaft and having a conical recess adapted to receive said conical projection and an exterior conical surface disposed opposite the conical surface on said flange, and rotary transmission members disposed between said last-named conical surfaces.

In testimony whereof I have hereunto set my hand in presence of two subscribing witnesses.

FERNAND VICTOR PERCIN.

Witnesses:
 Eugène Jullier,
 John F. Simons.